United States Patent [19]

Motosugi et al.

[11] 4,240,387

[45] Dec. 23, 1980

[54] INTAKE SYSTEM OF A MULTI-CYLINDER INTERNAL COMBUSTION ENGINE

[75] Inventors: Katsuhiko Motosugi; Shuhei Toyoda; Hiroshi Takahashi; Toshio Tanahashi, all of Toyota, Japan

[73] Assignee: Toyota Jidosha Kogyo Kabushiki Kaisha, Toyota, Japan

[21] Appl. No.: 58,758

[22] Filed: Jul. 19, 1979

[30] Foreign Application Priority Data

Aug. 10, 1978 [JP] Japan .................................. 53-97599

[51] Int. Cl.³ ........................ F02B 29/02; F02B 31/00
[52] U.S. Cl. ............................. 123/52 M; 123/52 MB; 123/188 M; 123/308; 123/432; 123/442
[58] Field of Search ............... 123/52 MB, 52 M, 108, 123/75 B, 188 M, 30 C

[56] References Cited

U.S. PATENT DOCUMENTS

| | | | |
|---|---|---|---|
| 1,727,265 | 9/1929 | Aseltine | 123/119 R |
| 1,856,736 | 5/1932 | Teeter | 123/52 M |
| 2,105,780 | 1/1938 | Davis | 123/52 M |
| 3,505,983 | 4/1970 | Hartel | 123/188 M X |

Primary Examiner—Tony M. Argenbright
Attorney, Agent, or Firm—Kenyon & Kenyon

[57] ABSTRACT

A multi-cylinder engine comprising a carburetor housing forming therein at least two branch mixture passages. Each of the branch mixture passages is connected to a respective intake port. A throttle valve of the carburetor is provided for each cylinder. Each of the throttle valves is arranged in the respective branch mixture passage and attached onto a common throttle shaft. A wedge shaped groove is formed on the upper inner wall of each of the branch mixture passages, and the common throttle shaft is arranged in the wedge shaped groove for causing the mixture to flow only along the bottom wall of the branch mixture passage. A single common connecting passage and branch connecting passages which are connected to the common connecting passage are provided. Each of the branch connecting passages opens into the respective intake port in the vicinity of the rear face of the valve head of the corresponding intake valve.

19 Claims, 8 Drawing Figures

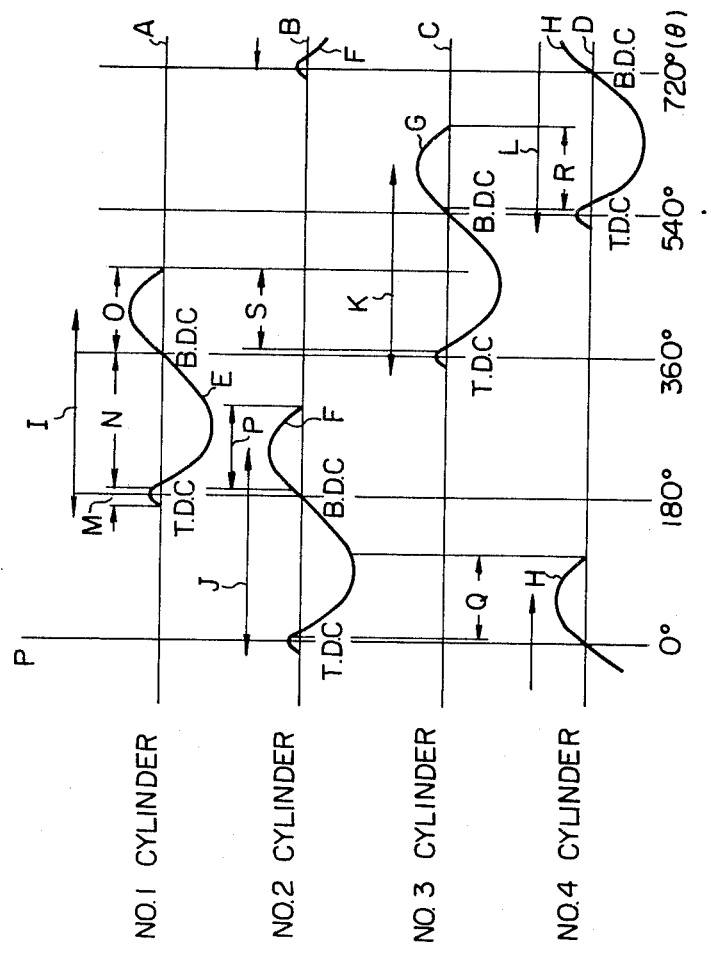

INTAKE SYSTEM OF A MULTI-CYLINDER INTERNAL COMBUSTION ENGINE

DESCRIPTION OF THE INVENTION

The present invention relates to an intake system of a multi-cylinder internal combustion engine.

Particularly in a gasoline engine, in order to obtain a high output power of the engine by increasing the volumetric efficiency when the engine is operating at a high speed under a heavy load, the shape of an intake port is so constructed that the intake port has as small a flow resistance as possible. In the case wherein the intake port has such a shape, since a considerably strong turbulence is spontaneously created in the combustion chamber of the engine when the engine is operating at a high speed under a heavy load, the burning velocity is sufficiently increased. However, when the same engine is operating at a low speed, a satisfactory strong turbulence is not created in the combustion chamber, thus resulting in a problem in that a sufficient increase in the burning velocity is not obtained.

As a method of creating a strong turbulence in the combustion chamber when an engine is operating at a low speed, there is a method of compulsorily creating a swirl motion in the combustion chamber by using a helically-shaped intake port or by using a shroud valve. However, in the case wherein such a method is adopted, since the flow resistance to which the mixture fed into the cylinder is subjected is increased, a problem occurs in that the volumetric efficiency is reduced when an engine is operating at a high speed under a heavy load. In addition, as an engine capable of creating a strong turbulence in the combustion chamber, an engine has been proposed, in which an intake passage comprises a main intake passage having a relatively large cross-section, and an auxiliary intake passage having a relatively small cross-section and opening into the intake port. In this engine, the mixture is fed into the combustion chamber from the auxiliary intake passage via the intake port when an engine is operating under a light load; as a result, a turbulence is produced in the combustion chamber by the mixture spouted from the auxiliary intake passage at a high speed. On the other hand, when an engine is operating under a heavy load, the mixture is fed into the combustion chamber via the main intake passage. It is true that, in this engine, it is possible to produce a strong turbulence in the combustion chamber when an engine is operating at a low speed under a light load, while ensuring a high volumetric efficiency when the engine is operating at a high speed under a heavy load. However, this engine has drawbacks in that the construction of a mixture passage switching mechanism for switching the mixture passage from the main intake passage to the auxiliary intake passage is complicated; in addition, it is impossible to produce a strong turbulence in the combustion chamber when the engine is operating at a low speed under a heavy load.

An object of the present invention is to provide an intake system of an internal combustion engine, which has a simple construction and which is capable of creating a strong turbulence in the combustion chamber independently of the engine speed when an engine is operating under a light load while ensuring a high volumetric efficiency when the engine is operating at a high speed under a heavy load.

According to the present invention, there is provided a multi-cylinder internal combustion engine having a plurality of cylinders, each having a combustion chamber and an intake valve which has a valve head, said engine comprising: at least one intake passage common to at least two cylinders and comprising a collecting portion having an inlet, and at least two branch intake passages branched off from said collecting portion, each of said branch intake passages having an upper wall and a bottom wall and being connected said respective combustion chamber via said corresponding intake valve; fuel supply means arranged in the inlet of said collecting portion; a common connecting passage; at least two branch connecting passages, each being connected to said common connecting passage and having an opening which opens into said respective branch intake passage, and; at least two rotatable throttle valves each being arranged in said respective branch intake passage at a position upstream of the opening of said corresponding branch connecting passage and having an upper edge and a lower edge which cooperates with the bottom wall of said corresponding branch intake passage to form therebetween a mixture flow passage, the cross sectional area of which is increased as the corresponding throttle valve is rotated in accordance with an increase in the level of the load of said engine, the upper edge of each of said throttle valves cooperating with the upper wall of said corresponding branch intake passage to prevent a mixture from flowing between the upper edge of said corresponding throttle valve and the upper wall of said corresponding branch intake passage.

The present invention may be more fully understood from the description of preferred embodiments of the invention set forth below, together with the accompanying drawings.

BRIEF DESCRIPTION OF THE DRAWINGS

In the drawings:

FIG. 8 is a graph showing changes in pressure in the intake port located at a position near the rear face of the valve head of the intake valve.

DESCRIPTION OF PREFERRED EMBODIMENTS

Figure 1:
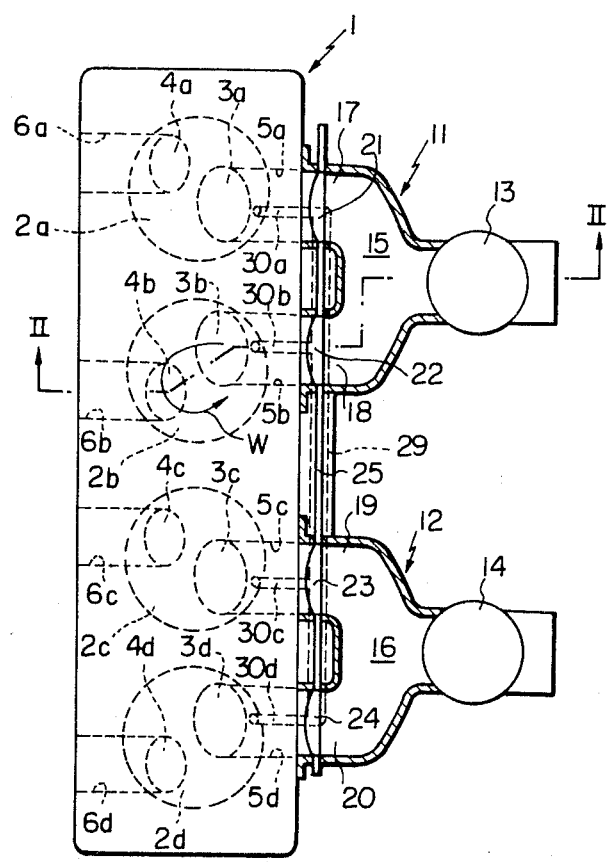
FIG. 1 is a plan view, partly in cross-section, of an embodiment of an engine according to the present invention.
Figure 2:
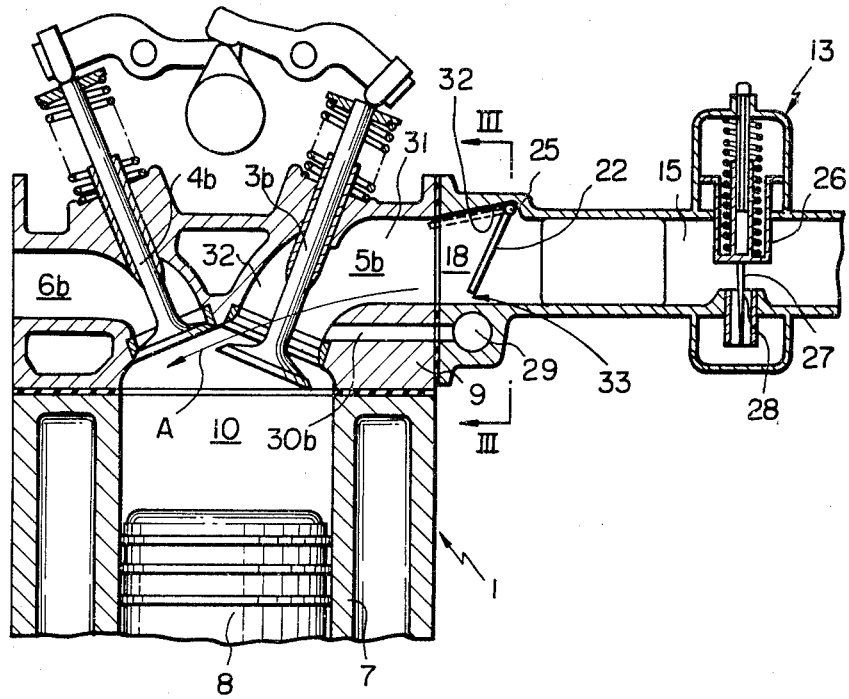
FIG. 2 is a cross-sectional side view taken along the line II—II in FIG. 1.

Referring to FIG. 1, 1 designates an engine body; 2a, 2b, 2c, 2d designate No. 1 cylinder, No. 2 cylinder, No. 3 cylinder and No. 4 cylinder, respectively; 3a, 3b, 3c, 3d designate intake valves; 4a, 4b, 4c, 4d exhaust valves; 5a, 5b, 5c, 5d intake ports; and 6a, 6b, 6c, 6d exhaust ports. Referring to FIG. 2, reference numeral 7 designates a cylinder block, 8 a piston which is reciprocally movable in the cylinder block 7, 9 a cylinder head fixed onto the cylinder block 7, and 10 a combustion chamber. The spark plug (not shown) is arranged in the combustion chamber 10.

Referring to FIGS. 1 and 2, a pair of carburetor housings 11, 12 is mounted on the engine body 1, and variable venturi type carburetor bodies 13, 14 are arranged in the carburetor housings 11, 12, respectively. Each of the mixture passages 15, 16 formed in the carburetor housings 11, 12 is divided into four respective branch mixture passages 17, 18, 19, 20, and each of the branch mixture passages 17, 18, 19, 20 is respectively connected to the intake ports 5a, 5b, 5c, 5d. Throttle valves 21, 22, 23, 24 of the carburetor bodies 13, 14 are arranged in the corresponding branch mixture passages 17, 18, 19, 20 and attached onto a common valve shaft 25. However, instead of being attached onto the common valve shaft 25, the throttle valves 21, 22, 23, 24 may be interconnected to each other by means of a link mechanism (not shown) so that the opening operation of all the throttle valves 21, 22, 23, 24 is controlled at the same time. As is illustrated in FIG. 2, a wedge shaped groove 32 is formed on the upper inner wall of the branch mixture passage 18, and the throttle shaft 25 is arranged in the wedge shaped groove 32. By positioning the throttle shaft 25 in the wedge shaped groove 32, the flow-resistance which the mixture flowing in the branch mixture passage 18 is subjected to becomes extremely small when the throttle valve 22 is fully opened, as illustrated by the broken line in FIG. 2. In addition, as is illustrated in FIG. 2, the carburetor body 13 comprises a movable suction piston 26, a movable needle 27 and a metering jet 28. As is well known to those skilled in the art, the suction piston 26 moves up and down so that the vacuum produced in the mixture passage 15 located between the suction piston 26 and the throttle valve 22 is maintained at a constant level.

A common connecting channel 29 extending in the longitudinal direction of the engine body 1 and having a cross-section which is smaller than that of the branch mixture passages 17, 18, 19, 20 is arranged beneath the throttle valves 21, 22, 23, 24. In addition, four channel branches 30a, 30b, 30c, 30d which are in communication with the common connecting channel 29 and which have a cross-section smaller than that of the branch mixture passages 17, 18, 19, 20 are formed in the cylinder head 9, and the channel branches 30a, 30b, 30c, 30d open into the intake ports 5a, 5b, 5c, 5d at a position near the rear faces of the valve heads of the corresponding intake valves 3a, 3b, 3c, 3d, respectively. The openings of the channel branches 30a, 30b, 30c, 30d are directed to valve gaps formed between the corresponding intake valves 3a, 3b, 3c, 3d and their valve seats when the intake valves 3a, 3b, 3c, 3d are opened, respectively.

FIG. 8 illustrates changes in pressure in the intake ports 5a, 5b, 5c, 5d. In FIG. 8, the abscissa θ indicates a crank angle, and the ordinate P indicates pressure in the intake port in the vicinity of the rear face of the valve head of the intake valve (hereinafter referred to as an intake port pressure). In addition, each of the reference lines A, B, C, D indicates the atmospheric pressure. Furthermore, in FIG. 8, the curved lines E, F, G and H indicate changes in the intake port pressure in the intake ports 5a, 5b, 5c and 5d, respectively, and the arrows I, J, K and L indicate the opening duration of the intake valves 3a, 3b, 3c and 3d, respectively. Referring to the change in pressure in the No. 1 cylinder shown in FIG. 8, the intake port pressure becomes a positive pressure over the range M of the crank angle immediately after the intake valve is opened, and then a vacuum is produced in the intake port of the No. 1 cylinder over the range N of the crank angle in which the piston moves downwards. After this, the intake port pressure again becomes a positive pressure over the range O of the crank angle after the piston begins to move upwards. The change in the intake port pressure in the remaining cylinders is the same as that in the intake port pressure in the No. 1 cylinder. Consequently, referring to the range P of the crank angle of the No. 1 cylinder and No. 2 cylinder shown in FIG. 8, it will be understood that a vacuum is produced in the intake port of the No. 1 cylinder, and that, at this time, the intake port pressure of the No. 2 cylinder is positive. In addition, from FIG. 8 it will be understood that, referring to the range Q of the crank angle of the No. 2 cylinder and No. 4 cylinder, a vacuum is produced in the intake port of the No. 2 cylinder and, at this time, the intake port pressure of the No. 4 cylinder is positive; referring to the range R of the crank angle of the No. 3 cylinder and the No. 4 cylinder, a vacuum is produced in the intake port of the No. 4 cylinder and, at this time, the intake port pressure of the No. 3 cylinder is positive; and referring to the range S of the crank angle of the No. 1 cylinder and the No. 3 cylinder, a vacuum is produced in the intake port of the No. 3 cylinder and, at this time, the intake port pressure of the No. 1 cylinder is positive. Consequently, referring to the No. 1 cylinder and the No. 2 cylinder shown in FIG. 8, it will be understood that, in the first half of the intake stroke of the No. 1 cylinder, the mixture in the intake port 5b of the No. 2 cylinder is fed into the intake port 5a of the No. 1 cylinder via the channel branch 30b, the common connecting channel 29 and the channel branch 30a due to the pressure difference between the vacuum in the intake port 5a and the positive pressure in the intake port 5b. In the same manner as described above, when the No. 2 cylinder is in the intake stroke, the mixture in the intake port 5d of the No. 4 cylinder is fed into the intake port 5b of the No. 2 cylinder via the channel branch 30d, the common connecting channel 29 and the channel branch 30b; when the No. 4 cylinder is in the intake stroke, the mixture in the intake ports 5c of the No. 3 cylinder is fed into the intake port 5d of the No. 4 cylinder via the channel branch 30c, the common connecting channel 29 and the channel branch 30d; and when the No. 3 cylinder is in the intake stroke, the mixture in the intake port 5a of the No. 1 cylinder is fed into the intake port 5c of the No. 3 cylinder via the channel branch 30a, the common connecting channel 29 and the channel branch 30c. As mentioned above, due to the pressure difference between the intake port pressures in the intake ports 5a, 5b, 5c, 5d, the mixture is spouted from the channel.

FIG. 2 shows the case wherein the engine is operating under a light load. Referring to FIG. 2, the throttle valve 22 is positioned at a position illustrated in FIG. 2 and, therefore, at this time, a mixture flow gap 33 is formed only between the lower edge of the throttle valve 22 and the bottom wall of the branch mixture passage 18. Consequently, the flow velocity of the mixture formed in the carburetor body 13 is increased as the mixture is collected towards the mixture flow gap 33. Then, the mixture passes through the mixture flow passage 33 at a high speed. After this, the mixture flows only along the bottom wall of the intake port 5b at a high speed, as illustrated by the arrow A in FIG. 2, and then, flows into the combustion chamber 10 through the valve gap formed between the intake valve 3b and its valve seat. In addition, as mentioned previously, the mixture is spouted from the channel branch 30b at the time of the intake stroke. As is illustrated in FIG. 2, since the opening of the channel branch 30b is directed to the valve gap formed between the intake valve 3b and its valve seat, the velocity of the mixture passing through the valve gap, as illustrated by the arrow A in FIG. 2, is increased by the mixture spouted from the channel branch 30b and, as a result, the mixture is caused to flow into the combustion chamber 10 at an extremely high speed. At this time, since the intake port 5b is tangentially connected to the circumferential inner wall of the combustion chamber 10, as illustrated in FIG. 2, a strong swirl motion, shown by the arrow W in FIG. 1, is created in the combustion chamber 10 by the mixture flowing into the combustion chamber 10, as illustrated in FIG. 2. As a result of this swirl motion, a burning velocity is considerably increased and a stable combustion can thus be obtained.

When the engine is operating under a heavy load, since the throttle valve 22 is fully opened, as illustrated by the broken line in FIG. 2, the mixture flows in the intake port 5b through the entire cross-section thereof. However, at this time, since the mixture is spouted from the channel branch 30b, a turbulence is created in the combustion chamber 10 by the mixture spouted from the channel branch 30b even when the engine is operating under a heavy load.

Figure 4:
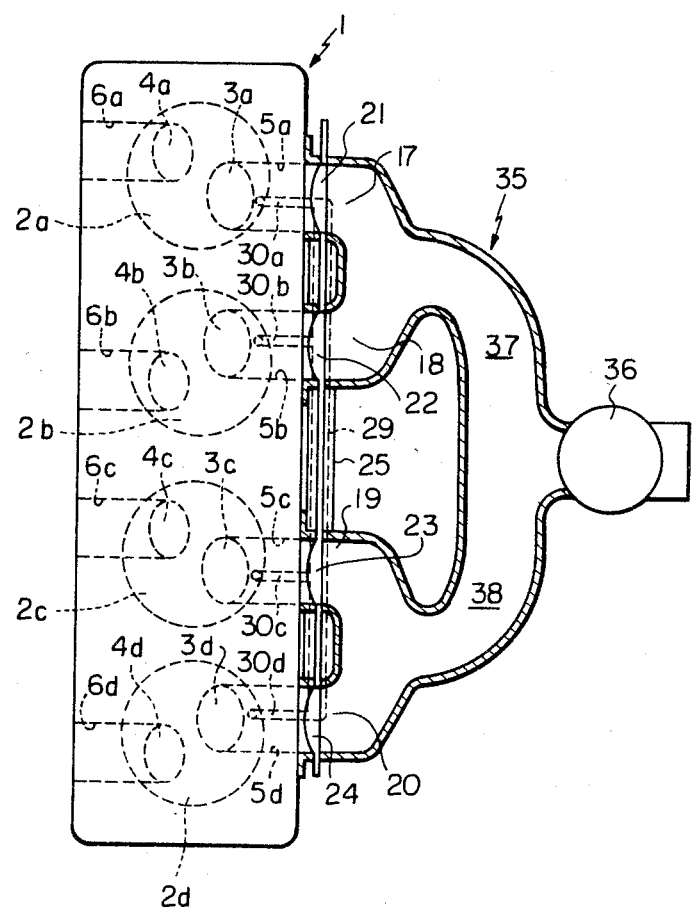
FIG. 4 is a plan view, partly in cross-section, of another embodiment according to the present invention.

FIG. 4 illustrates another embodiment according to the present invention. In this embodiment, a single variable venturi type carburetor body 36 having a construction which is the same as that of the carburetor body 13 illustrated in FIG. 2 is arranged in a carburetor housing 35. The outlet passage of the carburetor body 36 is divided into two mixture passages 37, 38, and each of the mixture passages 37, 38 is divided into four respective branch mixture passages 17, 18, 19, 20. Each of the throttle valves 21, 22, 23, 24 is arranged in the respective branch mixture passages 17, 18, 19, 20. In this embodiment, there is an advantage in that the number of the carburetor bodies can be reduced as compared with the case illustrated in FIG. 1.

Figure 3:
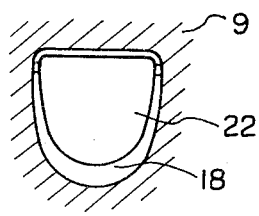
FIG. 3 is a cross-sectional view taken along the III-—III in FIG. 2.
Figure 5:
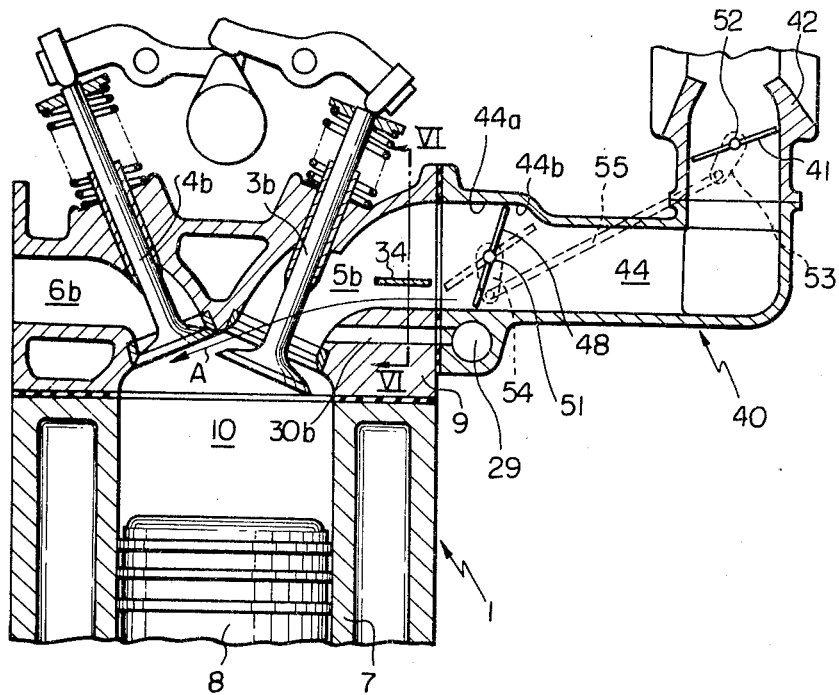
FIG. 5 is a cross-sectional side view of a further embodiment according to the present invention.
Figure 6:
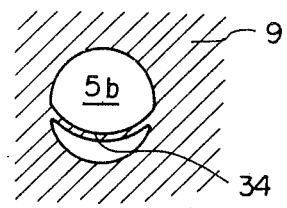
FIG. 6 is a cross-sectional view taken along the line VI—VI in FIG. 5.
Figure 7:
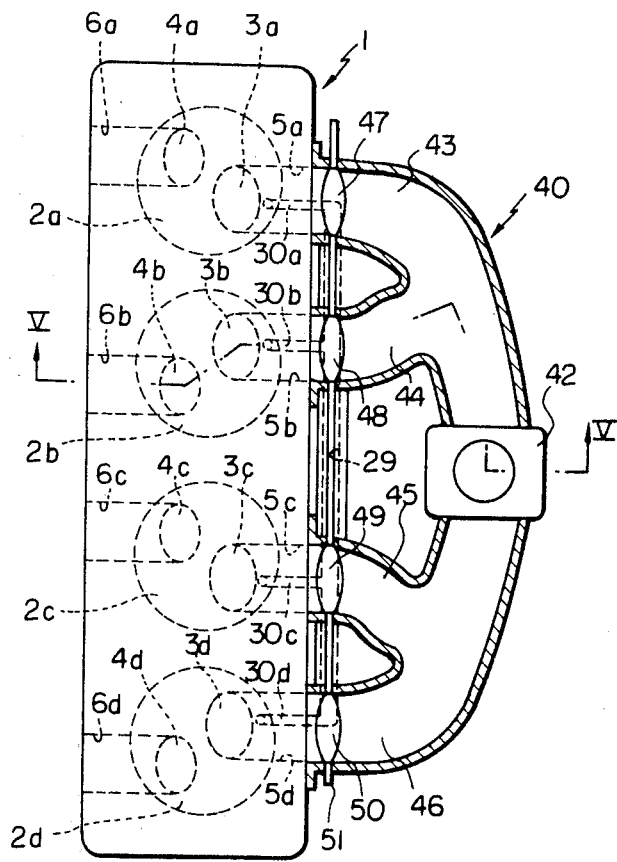
FIG. 7 is a plan view, partly in cross-section, of the engine illustrated in FIG. 5.

FIGS. 5 through 7 illustrate a further embodiment according to the present invention. Referring to FIGS. 5 through 7 an intake manifold 40 is fixed onto the engine body 1, and a carburetor 42 having a throttle valve 41 is mounted on the intake manifold 40. The intake manifold 40 comprises manifold branches 43, 44, 45, 46 which are connected to the intake ports 5a, 5b, 5c, 5d, respectively. Secondly throttle valves 47, 48, 49, 50 are arranged in the outlets of the manifold branches 43, 44, 45, 46, respectively, and attached onto a common valve shaft 51. As is illustrated in FIG. 5, an arm 53 attached onto a valve shaft 52 of the throttle valve 41 is interconnected to an arm 54 attached onto the common valve shaft 51 by means of a link 55, so that the secondary throttle valves 47, 48, 49, 50 are gradually opened as the throttle valve 41 is gradually opened. In addition, as is illustrated in FIG. 5, a cross-section enlarged portion 44a is formed in the manifold branch 44, and the secondary throttle valve 48 is arranged in the enlarged portion 44a. The upper wall 44b located at the end of the enlarged portion 44a forms a portion of a sphere, so that the mixture flow gap is not formed between the upper wall 44b and the upper edge of the secondary throttle valve 48 during the time the secondary throttle valve 48 is rotated from the position illustrated by the solid line in FIG. 5 to the position illustrated by the broken line in FIG. 5. Consequently, when the opening degree of the secondary throttle valve 48 is small and, thus, the engine is operating under a light load, the mixture flow gap is formed only between the lower edge of the secondary throttle valve 48 and the bottom wall of the enlarged portion 44a and, as a result, the mixture flows only along the bottom wall of the intake port 5b. In addition, as is illustrated in FIG. 3, it is preferable that a mixture stream guide plate 34 be arranged in the intake port 5b at a position near the bottom wall of the intake port 5b. By arranging the guide plate 34 as mentioned above, the creation of the stream of the mixture flowing only along the bottom wall of the intake port 5b can be ensured when the engine is operating under a light load. In this embodiment, the changes in pressure produced in the intake port at a position near the rear face of the valve head of the intake valve are as shown in FIG. 8. Consequently, since the mixture is spouted from the channel branches 30a, 30b, 30c, 30d into the combustion chamber 10 at a high speed, a strong swirl motion is created in the combustion chamber 10. In addition, in either of the above-described embodiments, it is possible to recirculate the exhaust gas into the common connecting channel 29.

As is illustrated in FIGS. 1, 2, 4, 5, and 7, by positioning the throttle valves 21, 22, 23, 24 at the outlets of the branch mixture passages 17, 18, 19, 20 and by positioning the secondary throttle valves 47, 48, 49, 50 at the outlets of the manifold branches 43, 44, 45, 46, the positive pressure which is caused by blowing the mixture back into the intake port is maintained without being attenuated. As a result of this, since the pressure difference between the positive pressure and the vacuum which act on the openings of the channel branches 30a, 30b, 30c, 30d is maintained at a large pressure difference for a long time, it is possible to produce an extremely strong swirl motion in the combustion chamber 10. In addition, since the mixture flows from the intake port of a given cylinder into the intake port of the other cylinder via the common connecting channel 29, the mixing operation of the mixture is improved and, at the same time, the distribution of fuel to each cylinder becomes uniform.

According to the present invention, by causing the mixture to flow only along the bottom wall of the intake port and increasing the flow velocity of that mixture by the mixture spouted from the channel branch, it is possible to produce a strong swirl motion in the combustion chamber when an engine is operating under a light load. As a result, the burning velocity can be increased independently of the engine speed when an engine is operating under a light load while ensuring a high volumetric efficiency when the engine is operating at a high speed under a heavy load.

While the invention has been described with reference to specific embodiments chosen for purposes of illustration, it should be apparent that numerous modifications could be made thereto by those skilled in the art without departing from the spirit and scope of the invention.

What is claimed is:

1. A multi-cylinder internal combustion engine having a plurality of cylinders, each having a combustion chamber and an intake valve which has a valve head, said engine comprising:
   at least one intake passage common to at least two cylinders and comprising a collecting portion having an inlet, and at least two branch intake passages branched off from said collecting portion, each of said branch intake passages having an upper wall and a bottom wall and being connected to said respective combustion chamber via said corresponding intake valve;

fuel supply means arranged in the inlet of said collecting portion;

a common connecting passage;

at least two branch connecting passages each being connected to said common connecting passage and having an opening which opens into said respective branch intake passages, and;

at least two rotatable throttle valves each being arranged in said respective branch intake passage at a position upstream of the opening of said corresponding branch connecting passage and having an upper edge and a lower edge which cooperates with the bottom wall of said corresponding branch intake passage to form therebetween a mixture flow passage, the cross sectional area of which is increased as the corresponding throttle valve is rotated in accordance with an increase in the level of the load of said engine, the upper edge of each of said throttle valves cooperating with the upper wall of said corresponding branch intake passage to prevent a mixture from flowing between the upper edge of said corresponding throttle valve and the upper wall of said corresponding branch intake passage.

2. A multi-cylinder internal combustion engine as claimed in claim 1, wherein each of said throttle valves is attached onto a throttle shaft arranged on the upper wall of said corresponding branch intake passage, the upper edge of each of said throttle valves cooperating with the upper wall of said corresponding branch intake passage to always prevent the mixture from flowing between the upper edge of said corresponding throttle valve and the upper wall of said corresponding branch intake passage.

3. A multi-cylinder internal combustion engine as claimed in claim 2, wherein said throttle valves are attached onto a common throttle shaft.

4. A multi-cylinder internal combustion engine as claimed in claim 2, wherein a wedge shaped groove is formed on the upper wall of each of said branch intake passages, said throttle shaft being arranged in said wedge shaped groove.

5. A multi-cylinder internal combustion engine as claimed in claim 1, wherein each of said throttle valves is attached onto a throttle shaft extending through a center of said respective branch intake passage, the upper edge of each of said throttle valves cooperating with the upper wall of said corresponding branch intake passage to prevent the mixture from flowing between the upper edge of said corresponding throttle valve and the upper wall of said corresponding branch intake passage when the opening degree of each of said throttle valves is below a predetermined degree.

6. A multi-cylinder internal combustion engine as claimed in claim 5, wherein said throttle valves are attached onto a common throttle shaft.

7. A multi-cylinder internal combustion engine as claimed in claim 5, wherein each of said branch intake passages comprises a reduced diameter portion, an increased diameter portion and a connecting portion connecting said reduced diameter portion to said increased diameter portion, each of said throttle valves being arranged in said corresponding increased diameter portion and cooperating with the upper wall of said corresponding connecting portion at the upper edge of said corresponding throttle valve.

8. A multi-cylinder internal combustion engine as claimed in claim 7, wherein the upper wall of said connecting portion forms a portion of a sphere.

9. A multi-cylinder internal combustion engine as claimed in claim 1, wherein each of said throttle valves is arranged at a position near said intake valve.

10. A multi-cylinder internal combustion engine as claimed in claim 9, wherein said engine further comprises at least one carburetor housing forming therein at least two mixture passages each having an outlet which is connected to said respective combustion chamber via said corresponding intake valve, each of said throttle valves being arranged in said outlet of said respective mixture passage.

11. A multi-cylinder internal combustion engine as claimed in claim 1, wherein said engine further comprises another throttle valve arranged in said intake passage, said throttle valves being operatively connected to said other throttle valve for increasing the opening degree of said throttle valves in accordance with an increase in the opening degree of said other throttle valve.

12. A multi-cylinder internal combustion engine as claimed in claim 11, wherein said throttle valves are mechanically connected to said other throttle valve by means of a link mechanism.

13. A multi-cylinder internal combustion engine as claimed in claim 11, wherein said engine further comprises at least one intake manifold having at least two outlets, each of said throttle valves being arranged in the respective outlet of said intake manifold.

14. A multi-cylinder internal combustion engine as claimed in claim 1, wherein said engine further comprises mixture guide means arranged in said branch intake passages at a position located downstream of and near said throttle valves.

15. A multi-cylinder internal combustion engine as claimed in claim 14, wherein said mixture guide means comprises at least two guide plates each being arranged in the vicinity of the bottom wall of said respective branch intake passage.

16. A multi-cylinder internal combustion engine as claimed in claim 1, wherein said common connecting passage has a cross-section which is smaller than that of said branch intake passage.

17. A multi-cylinder internal combustion engine as claimed in claim 1, wherein each of said branch connecting passages has a cross-section which is smaller than that of said branch intake passage.

18. A multi-cylinder internal combustion engine as claimed in claim 1, wherein the opening of each of said branch connecting passages is arranged in the vicinity of said valve head of said corresponding intake valve.

19. A multi-cylinder internal combustion engine as claimed in claim 18, wherein the opening of each of said branch connecting passages is directed to a valve gap formed between said corresponding intake valve and a valve seat thereof when said intake valve is opened.

* * * * *